United States Patent [19]

Konig et al.

[11] Patent Number: 5,100,067
[45] Date of Patent: Mar. 31, 1992

[54] FEEDING DEVICE FOR A SEPARATING APPARATUS

[75] Inventors: Helmut Konig, Bad Schwartau; Wolfgang Rose, Eckhorst, both of Fed. Rep. of Germany

[73] Assignee: Nordischer Maschinenbau Rud. Baader Gmbh & Co KG, Lubeck, Fed. Rep. of Germany

[21] Appl. No.: 592,987

[22] Filed: Oct. 4, 1990

[30] Foreign Application Priority Data

Oct. 6, 1989 [DE] Fed. Rep. of Germany ... 8911890[U]

[51] Int. Cl.⁵ .................................. B02C 18/16
[52] U.S. Cl. .......................... 241/79; 241/236; 241/241; 241/293
[58] Field of Search .......... 241/79, 236, 293, 294, 241/295, 283; 83/423, 424

[56] References Cited

U.S. PATENT DOCUMENTS 2,510,291 6/1950 McLauchlan ............... 83/423
3,862,721 1/1975 Flair ........................ 241/236

FOREIGN PATENT DOCUMENTS 388730  1/1924  Fed. Rep. of Germany ...... 241/236
963267  5/1957  Fed. Rep. of Germany ...... 241/236
2032774 1/1972  Fed. Rep. of Germany .
3617276 11/1987 Fed. Rep. of Germany ...... 241/236
7881    7/1926  Japan .
81925  11/1934  Sweden ...................... 241/236
559955  5/1977  U.S.S.R. .................... 241/283

Primary Examiner—Mark Rosenbaum
Attorney, Agent, or Firm—Fay, Sharpe, Beall, Fagan, Minnich & McKee

[57] ABSTRACT

A feeding device comprising a pair of oppositely driven rotational bodies is provided as an auxiliary aggregate arranged upstream of a continuously working presser belt separating machine for separating flowable and non-flowable constituents mixed with each other, one of the rotational bodies including a set of coaxially arranged circular knives spaced with regard to each other, while the other one is shaped as a prismatic body having at least one vane, the latter being provided with radial slots into which the circular knives can intrude.

6 Claims, 1 Drawing Sheet

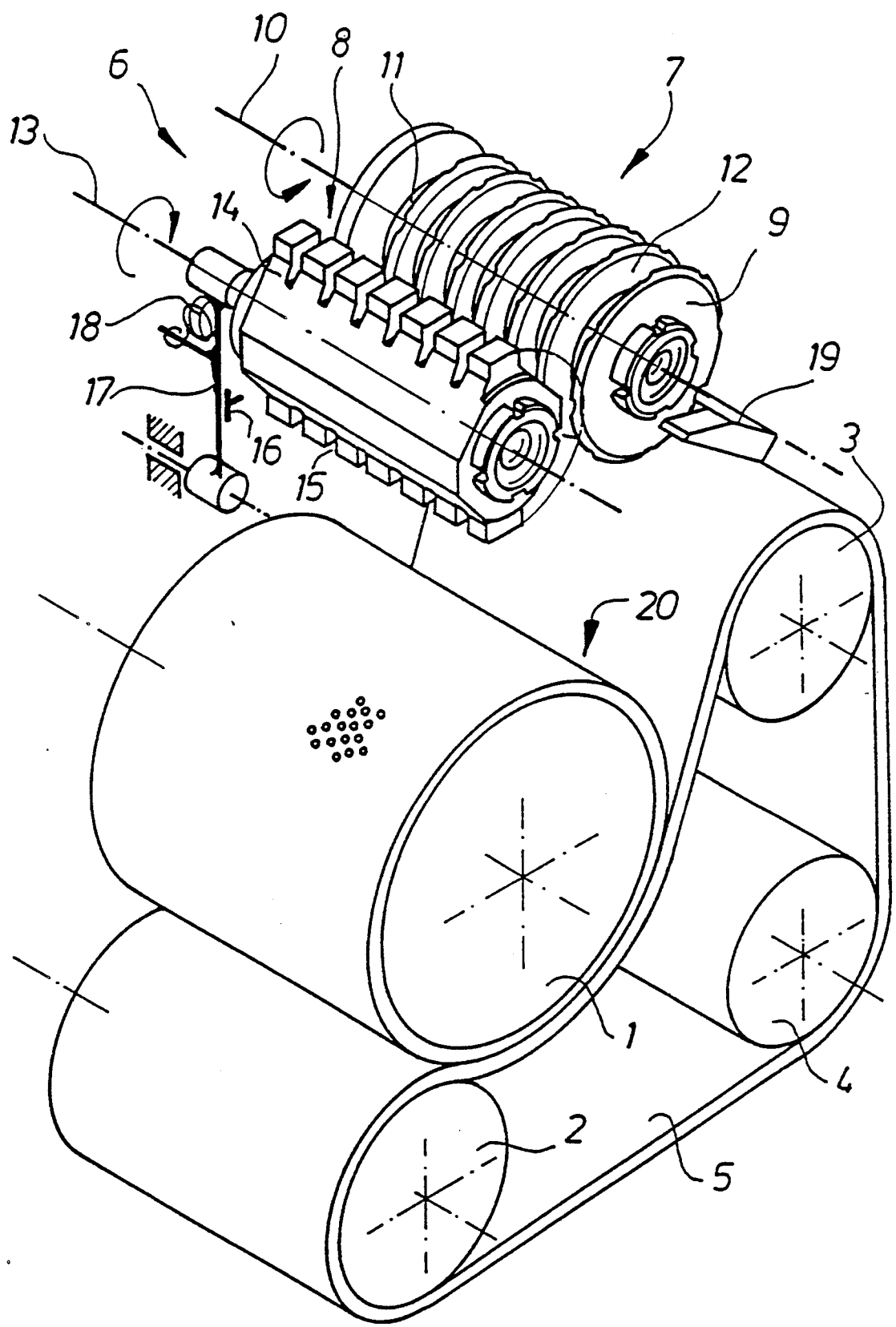

FEEDING DEVICE FOR A SEPARATING APPARATUS

BACKGROUND OF THE INVENTION

1. Field of the Invention

The invention relates to a feeding device for use in connection with a separating apparatus for processing flowable and non-flowable constituents mixed with each other and supplied thereto via a feeding area thereof, in particular with a separating apparatus working continuously and including a presser belt and a perforated drum, which feeding device is adapted to be arranged upstream of the separating apparatus in the feeding area thereof.

2. Description of the Related Art

Such devices are known from the state of the art.

For example, JP Utility Model Publication 26-7881 discloses a device which, apart from aiming at creating a cramming or stuffing effect, also has the object of equalising and pre-crushing the material to be processed. This is performed by providing rotational bodies with entrainer arms projecting from their circumferential surfaces and being sickle-shaped, the arrangement of the rollers forming the rotational bodies being such that the circles of rotation of the entrainer arms overlap each other.

There are essential disadvantages in this device. For example, it cannot be avoided that the material to be processed forms laps on the rotational bodies, which lap formation depends on the type and shape of the material to be processed. On the other hand, a cramming effect is created which depends on the type of the material to be processed and cannot be controlled, which may lead to an overloading of the subsequent processing machine.

Furthermore, there is disclosed a method in DE-OS 20 32 774, the aim of which is to form material to be processed having the shape of large pieces into a "mat" which is then to be supplied to a presser belt separating apparatus. To this end, a pair of rollers driven to revolve in opposite directions is used, which rollers are intended to mill or roll the material to be processed into a mat of equal thickness depending on the distance set between the rollers. This device is primarily intended for processing material containing bones.

This concept has not proved successful, because the entraining ability of the rollers is strongly varying depending on the type of the material supplied, i.e. a dosing of the amount to be supplied is impossible.

Finally, U.S. Pat. No. 3,396,768, discloses a two-step crushing device for equalising the size of the pieces of the material to be processed.

SUMMARY OF THE INVENTION

It is a major object of the present invention to suggest a feeding device which is able to prepare meat material having the shape of large pieces and being bone-free, e.g. whole deboned parts of beef legs such as beef calves, in a manner that the subsequent processing apparatus, e.g. a presser belt separating machine is able to draw-in such meat material and to avoid accurately the formation of bridges.

It is another essential object of the present invention to prevent safely the formation of laps in the feeding device.

In a feeding device for use in connection with a separating apparatus for processing flowable and non-flowable constituents mixed with each other and supplied thereto via a feeding area thereof, in particular with a separating apparatus working continuously and including a presser belt and a perforated drum, which feeding device is adapted to be arranged upstream of the separating apparatus in the feeding area thereof and comprises at least two rotational bodies cooperating with each other, mounted in a casing and driven to rotate in opposite directions relative to each other, the above objects are achieved according to the present invention in that a first one of said rotational bodies includes a set of coaxially arranged circular knives spaced with regard to each other, and a second one of the rotational bodies is provided as a prismatic body of at least one-vane shape, wherein this at least one vane is provided with radial intrusion slots adapted to receive the circular knives therein.

The main advantage to be achieved thereby lies essentially in that the material to be treated can be formed into a net-like adhering "mat" without tearing, pulling and breaking, which is advanced in an intermittent manner into the draw-in area of the subsequent apparatus. The conveying phase of this intermittent advancing results when the vane or vanes of the second rotational body approach the pressed body, and this conveying phase is interrupted after the passage of the vane or vanes through the circular knives by a phase which is different with regard to the conveying, so that possible jamming or piling-up downstream of the feeding device can be equalised or any material seized by the processing apparatus can be pulled through the feeding device.

When the device according to the present invention is used in connection with a presser belt separating machine, quiet running of this apparatus is achieved and improved while, as a whole, the through-put is increased. Furthermore, the energy efficiency is improved, while the power level of the driving motor is evened out essentially.

Advantageously, the two rotational bodies may be arranged to be displaced parallel with regard to each other against predetermined force in order to restrict the radial forces acting on the two rotational bodies, as well as relieving the load of the circular knives.

It is possible to adapt the feeding device to the conditions and circumstances caused by the structure of the apparatus and the material by advantageously providing means for controlling the rotational speed of at least the second rotational body automatically.

In order to improve the conveying component of the rotational bodies, it is expedient to shape the web forming the vane or vanes in the manner of a toothed comb of a herringbone gear wheel, the apexes or points thereof pointing against the rotational direction of the second rotational body.

BRIEF DESCRIPTION OF THE DRAWINGS

Other and further objects of the present invention will be apparent from the following description and claims and are illustrated in the accompanying single drawing which by way of illustration schematically shows the axonometric of a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the scope of the appended claims.

DETAILED DESCRIPTION OF THE PREFERRED EMBODIMENT

FIG. 1 shows the essential functional components of a separating machine incorporating the feeding device according to the present invention. Such essential components of a presser belt separating apparatus are shown by way of a perforated drum 1, a presser roller 2, deflection rollers 3 and 4 and an endless presser belt 5, which is pressed against the perforated drum 1 by the presser roller 2 and is guided endlessly via the deflection rollers 3 and 4. Thus, a draw-in wedge 20 is formed between the presser belt 5 and the perforated drum 1. Above this draw-in wedge forming the feeding area of the separating apparatus, a feeding device according to the present invention is arranged mounted in a not-shown frame of the presser belt separating apparatus. This feeding device comprises a pair-wise arranged set of two rotational bodies 7 and 8, which are driven in a suitable manner to rotate in opposite directions. The first rotational body 7 comprises a set of circular knives 9, which are mounted on a common axle 10 and spaced with respect to each other by way of spacer rings 11 thus forming clearances 12 between the knives. The second rotational body 8 is formed by a prismatic body rotating about an axis 13. When seen in the cross section of the prismatic body, this has, according to the represented exemplified embodiment, two radially extending vanes 14 opposing each other, which form webs extending parallel to the axis 13. The vanes 14 are provided with radial protrusions corresponding to radial intrusion slots 15, which can receive the circular knives of the rotational body 7 therein. The depth of intrusion can be set and adjusted by means of a stop 16, which supports the axis 13 mounted on a lever 17 against the force of a tension spring 18. The tension of this spring can be adjusted. In its basic position the stop 16 ensures that the vanes 14 can intrude between the circular knives 9 safeguarding a predetermined distance of their cutting edges to the periphery of the spacing rings 11. Furthermore, a stripping comb 19 is provided in the lower region of the rotational body 7, which comb intrudes between the circular knives 9 as well.

The function of the feeding device according to the present invention is described below by following processing material on its way through the apparatus. In this context it appears worth mentioning that the special effect and function of the feeding device 6 according to the present invention become particularly clear when describing them by way of the processing of whole deboned beef calves, which are fed into a not-shown feeding funnel arranged around the feeding device 6. In such a case, the beef calf rests with its total weight on the two rotational bodies 7 and 8 and is pushed against the circular knives 9 when a vane 14 approaches. It is then conveyed towards the draw-in wedge 20 of the presser belt separating apparatus by means of the leading shoulder of the vane 14. While the vane 14 intrudes between the circular knives 9 these cut through the material to be processed, so that through-cuts of limited length result in the material to be processed because the vanes 14 take their intruding position only during a part of their revolution. When the vane 14 emerges from the position between the knives 9, the advancing engagement on the material to be processed as well as the radial displacement thereof against the circular knives 9 are reduced, so that during this phase incisions merely continuing the through-cuts occur, at least if the thickness of the material to be processed is larger than the distance of the hub of the rotational body 8 from the cutting edges of the circular knives 9. Thereafter, the next vane 14 follows, so that the described cycle is repeated.

Harder and tougher constituents such as sinews, tendons, cartilages and the like have the effect that the rotational body 8 is displaced depending on the setting of the force of the tension spring 18, whereby the loading and straining of the circular knives 9 is restricted. The resilient support may also be performed by means of a hydraulic system having an integrated gas reservoir whose pressure can be adapted to the requirements of each case e.g. by means of a manual pump.

Following the above described treatment the material to be processed is formed into a highly flexible "mat" from net-like adhering parts, which net can be drawn-in without much ado by the separating apparatus. This guarantees a careful and load-reduced working of the machine at high through-put. When processing comparatively large meat portions such as the aforementioned beef calves, one will obtain the further advantage of the described effect of the feeding device 6 that the calf piece, after having been seized in the draw-in wedge 20, is pulled through the feeding device 6 in a step-wise manner following the rhythm of the changing or intermittent engagement of the vanes 14. On the other hand, when the feeding or supplying amount surmounts the throughput performance of the separating apparatus, a rhythmical equalising of the jam thus caused in front of the draw-in wedge 20 can be equalised due to the rhythmically varying conveying effect of the feeding device 6.

In order to improve the conveying effect of the feeding device 6, the vane 14-forming webs of the rotational body 8 can be shaped as, or extend in the manner of a toothed comb of a herringbone or double helical gear wheel, the apex or "arrow" thereof pointing against the direction of revolution of the rotational body 8.

What is claimed is:

1. A feeding device for feeding meat material to a meat processing stage, comprising at least two rotational bodies cooperating with each other and driven to rotate in opposite directions relative to each other to advance meat material between the two rotational bodies tangentially thereto, from a point of rotational convergence thereof to a point of rotational divergence thereof, wherein:
   a) a first one of said rotational bodies includes a set of coaxially arranged circular knives spaced apart from each other, and
   b) a second one of said rotational bodies includes at least one axially-extending vane having radial slots for receiving the circular knives therein and a corresponding plurality of alternating radial protrusions for intermittently contacting and thereby advancing the meat material between the two rotational bodies by causing tangential entry at the point of convergence and tangential exit at the point of divergence due to the rotation of the second rotational body.

2. A feeding device as claimed in claim 1, wherein the rotational speed of said second rotational body can be controlled automatically.

3. A feeding device as claimed in claim 1, further comprising means for displacingly locating one said rotational body with respect to the other said rotational body, said locating means including spring means for biasing said one rotational body towards the other with a predetermined force.

4. A feeding device as claimed in claim 3, wherein the rotational speed of said second rotational body can be controlled automatically.

5. A feeding device as claimed in claim 3, wherein said locating means includes means for preventing displacement of said one rotational body with respect to the other rotational body beyond a predefined distance.

6. In a meat processing system including a feeding device for feeding meat material to a separating apparatus, said separating apparatus including means for processing flowable and non-flowable constituents mixed with each other and supplied thereto via a feeding device, said separating apparatus including a presser belt cooperating with a perforated drum to advance meat therebetween, wherein the improvement in said feeding device comprises at least two rotational bodies cooperating with each other and driven to rotate in opposite directions relative to each other, and wherein:

a) a first one of said rotational bodies includes a set of coaxially arranged circular knives spaced apart from each other, and b) a second one of said rotational bodies includes at least one axially-extending vane having radial slots for receiving the circular knives therein and a corresponding plurality of alternating radial protrusions for intermittently contacting and thereby advancing the meat material due to the rotation of the second rotational body.

* * * * *